United States Patent
Taropa et al.

(10) Patent No.: US 9,639,581 B1
(45) Date of Patent: *May 2, 2017

(54) QUERY COMPLETIONS

(71) Applicant: Google Inc., Mountain View, CA (US)

(72) Inventors: Emanuel Taropa, San Jose, CA (US); Ishai Rabinovitz, Haifa (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,763

(22) Filed: Jun. 6, 2016

Related U.S. Application Data

(63) Continuation of application No. 14/141,820, filed on Dec. 27, 2013, now Pat. No. 9,361,406.

(51) Int. Cl.
   *G06F 17/30* (2006.01)
   *G06N 7/00* (2006.01)

(52) U.S. Cl.
   CPC .... *G06F 17/3053* (2013.01); *G06F 17/30867* (2013.01); *G06N 7/005* (2013.01)

(58) Field of Classification Search
   USPC ............... 707/687, 607, 608, 705, 790, 813
   See application file for complete search history.

(56) References Cited

U.S. PATENT DOCUMENTS

2012/0047025 A1* 2/2012 Strohman ........... G06F 17/3064
                                                               705/14.71

OTHER PUBLICATIONS

U.S. Appl. No. 13/928,939, filed Jun. 27, 2013, Dean.

* cited by examiner

*Primary Examiner* — Sana Al Hashemi
(74) *Attorney, Agent, or Firm* — Fish & Richardson P.C.

(57) ABSTRACT

Methods, systems, and apparatus, including computer programs encoded on computer storage media, for ranking query completions based on activity session data. One of the methods includes receiving a query prefix from a user. A reference parameter for the user is obtained. One or more likely queries that are likely to co-occur with the reference parameter in user activity sessions are identified, wherein each likely query has an associated prediction score. A ranking of the one or more likely queries is provided in response to receiving the query prefix.

21 Claims, 5 Drawing Sheets

QUERY COMPLETIONS

CROSS-REFERENCE TO RELATED APPLICATION

This is a continuation of U.S. application Ser. No. 14/141,820, filed on Dec. 27, 2013, the disclosure of which is considered part of and is incorporated by reference in the disclosure of this application.

BACKGROUND

This specification relates to search engines.

Internet search engines aim to identify resources, e.g., web pages, images, text documents, multimedia content, e.g., videos, that are relevant to a user's information needs and to present information about the resources in a manner that is most useful to the user. Internet search engines generally return a set of search results, each identifying a respective resource, in response to a user-submitted query.

Search systems that operate Internet search engines can also provide query completions to users to help users satisfy their informational needs. As used in this specification, the term "query completion" refers to a suggested sequence of one or more terms that can be used as a query. Some search systems provide query completions in a list as the user is entering a query. A user device interface for a search system typically sends input to the search system as the user enters each character of a query, and the search system provides query completions that match the entered characters. The characters sent to the search system before the user enters a search command input, e.g., hitting the "Enter" key on an input keyboard or a "search" button on a user interface, may be referred to as a "query prefix." Once the query completions are received, the user device displays the query completions for user selection. The user can select one of the query completions to submit the query completion as a query to a search system without having to type the query manually to enter the query.

FIG. 1A illustrates an example presentation 100 of query completions 120a provided in a prior art way by a search system. The example presentation 100 includes a list of query completions 120a that are provided for the one-character query prefix 105, "n".

The query prefix 105 can be submitted to a search system by software of a graphical user interface of a web browser or by software of a user interface of some other software application installed on a user device, e.g., a mobile application installed on a mobile computing device. In response to receiving the query prefix 105, the search system can provide a search results page 100 or other responsive data in a form that can be presented on the user device. For example, the search results page 100 can be provided as a markup language document, e.g., a HyperText Markup Language document, and the user device can render the document, e.g., using a web browser, in order to present the search results page 100 on a display of the user device.

The search results page 100 includes query completions 120a that represent potential completions of the query prefix 105 in a ranked order. The query completion 122a, "news", is ranked first. This may be so even if the user has implicitly, e.g., through previously submitted queries, or explicitly, e.g., through a user profile, shown a greater interest babies and parenting. Notably, the prior art search system may not consider a previous query of the user when generating query completions 120a, or may only consider previously submitted queries that match the query prefix.

The search results page 100 also includes search results 112a and 114a, which may be provided while the user is entering the query, in other words, before the user has is finished entering the query. Search results 112a, 114a provided in this way will be referred to as "instant" search results. A search system can obtain the search results 112a, 114a by obtaining search results that satisfy the currently highest-ranked query completion. In this example, the search results 112a, 114a have been obtained as search results for the highest-ranked query completion for query prefix 105, which is "basketball".

SUMMARY

This specification describes how a system can use a general purpose action prediction engine to rank query completions based on how likely the query completions are to co-occur, in records of user activity of many users, with a query previously entered by the user. A reference query can be used to search the records of user activity to identify likely query completions.

In general, one innovative aspect of the subject matter described in this specification can be embodied in methods that include the actions of receiving a query prefix from a user; obtaining a reference parameter for the user; identifying one or more likely queries that are likely to co-occur with the reference parameter in user activity sessions, wherein each likely query has an associated prediction score; determining a ranking of the one or more likely queries according to the prediction scores; and providing the ranking of the one or more likely queries in response to receiving the query prefix. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The reference parameter is a query previously submitted by the user. The reference parameter is a geographic location, a language preference, or an interest associated with a user profile. The actions include obtaining initial scores of the one or more likely queries; and determining respective modified scores for the likely queries from the initial scores and the prediction scores of the one or more likely queries. Obtaining the initial scores of the one or more likely queries comprises obtaining scores in a baseline collection of query completions for the query prefix. Identifying one or more likely queries that are likely to co-occur with the reference parameter in user activity sessions comprises determining that the reference parameter and one or more characters of the query prefix corresponds to an entry in a cache of likely queries, wherein each cache entry in the cache is associated with one or more previously determined likely queries; and obtaining one or more likely queries associated with the entry in the cache without performing a search of user activity sessions for the likely queries. The actions include receiving a second query prefix comprising a subsequent character to the query prefix; generating a key comprising the reference parameter and a subset of characters of the query prefix; determining that the key corresponds to an entry in a cache of likely queries; and returning one or more likely queries associated with the entry in the cache of likely queries. The actions include filtering the one or more likely queries according to the second query prefix that includes the subsequent character. Identifying one or more likely queries that are likely to co-occur with the reference parameter in user activity sessions comprises determining that a process has registered a search of user activity sessions for the likely queries based on the reference parameter and the query prefix; and after the process has completed the search of user activity sessions for the likely queries based on the reference parameter and the query prefix, obtaining one or more likely queries from a result of the search. Identifying one or more likely queries that are likely to co-occur with the reference parameter in user activity sessions comprises providing, to one or more leaf servers, a first character of the query prefix, wherein each leaf server returns, to an intermediate server or a root server, only likely queries that begin with the first character of the query prefix. The actions include determining whether the one or more likely queries occur in a baseline collection of query completions; and filtering any of the one or more likely queries that do not occur in the baseline collection of query completions. Determining respective modified scores for the likely queries from the initial scores of the one or more likely queries comprises computing a new ranking score for the likely query based on multiplying an initial ranking score of the likely query by a ranking factor. The ranking factor R is given by $$R = \frac{P(x|q)}{P(x)},$$

wherein P(x|q) is a measure of a likelihood of the likely query x occurring in an activity session given that the reference parameter q also occurred in a same activity session, and P(x) is a measure of the likelihood of the likely query x appearing in an activity session.

The subject matter described in this specification can be implemented in particular systems so as to realize one or more of the following advantages. Ranking query completions based on queries that are highly likely to co-occur with a previous query can provide users with more relevant and more personalized query completions. Users may also see useful queries that they would not have otherwise seen. A prediction engine using a cache can improve system performance and prevent a prediction engine from doing overly duplicative searching. A prediction engine filtering at leaf servers reduces the amount of information exchanged between servers. Filtering by only a subset of characters of the query prefix can reduce response latency.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search system can improve query completions by considering information about a user, in particular, a query previously submitted by the user. A previously submitted query can be indicative of the interests of the user, in particular, of present interests of the user, which can be useful when determining relevant query completions for a potentially short query prefix that may be devoid of other information.

Figure 1A:
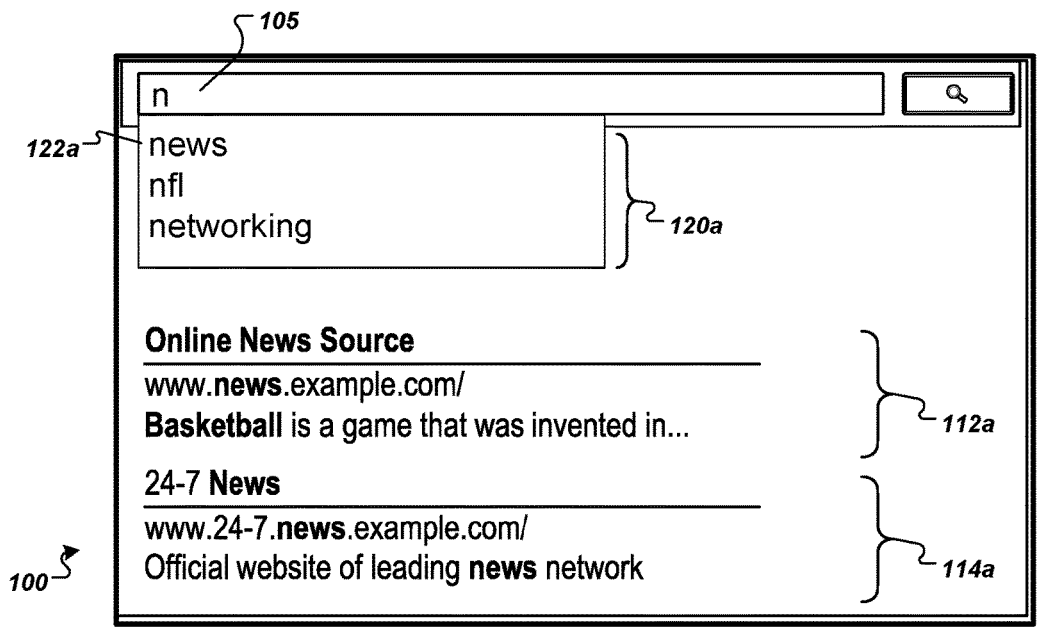
FIG. 1A illustrates an example presentation of query completions provided in a prior art way by a search system.
Figure 1B:
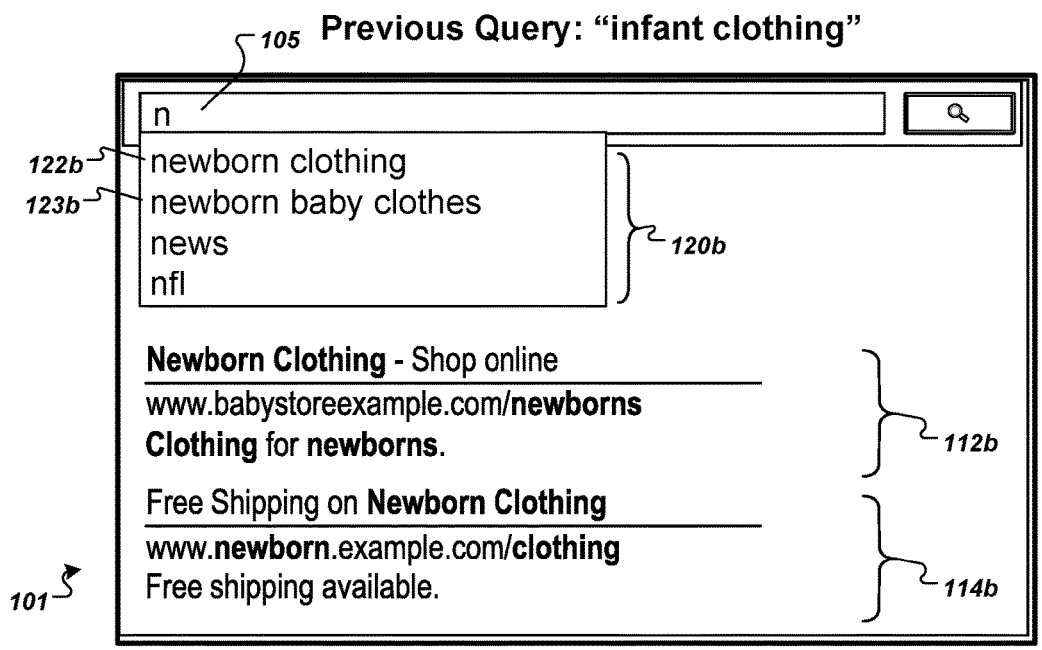
FIG. 1B illustrates an example presentation of query completions provided by a search system.

FIG. 1B illustrates an example presentation 101 of query completions 120b provided by a search system. The example presentation 101 includes a list of query completions 120b that are provided for the one-character query prefix 105, "n". In this example, it is assumed that the user previously submitted the query "infant clothing". The search system can use this information to provide more relevant, more useful, or more personalized query completions for the user using the techniques described below.

For example, a search system may determine that a user who has recently entered the query "infant clothing" is more likely to be currently interested in baby clothes than in news. Thus, the search system can generate query completions that are likely to co-occur in user activity data with the previous query "infant clothing". For example, the search system can determine that the query completion 122b "newborn clothing" and the query completion 123b "newborn baby clothes" are likely to co-occur in user activity data with the previous query "infant clothing". The query completions 120b may not have otherwise appeared among a number of top-ranked query completions, had the previous query not been considered.

Serving query completions 120b determined in this way may also result in the search system providing more relevant search results for a query prefix. For example, the search results 112b, 114b are that were obtained for the query "newborn clothing" are more likely to be considered relevant by a user whose previous query was "infant clothing" than search results that relate to news.

In some implementations, the search system provides users the ability to control whether their previously submitted queries are stored by the system as queries associated with the users, for how long they are stored, and/or whether they may be used in generating query completions.

Figure 2:
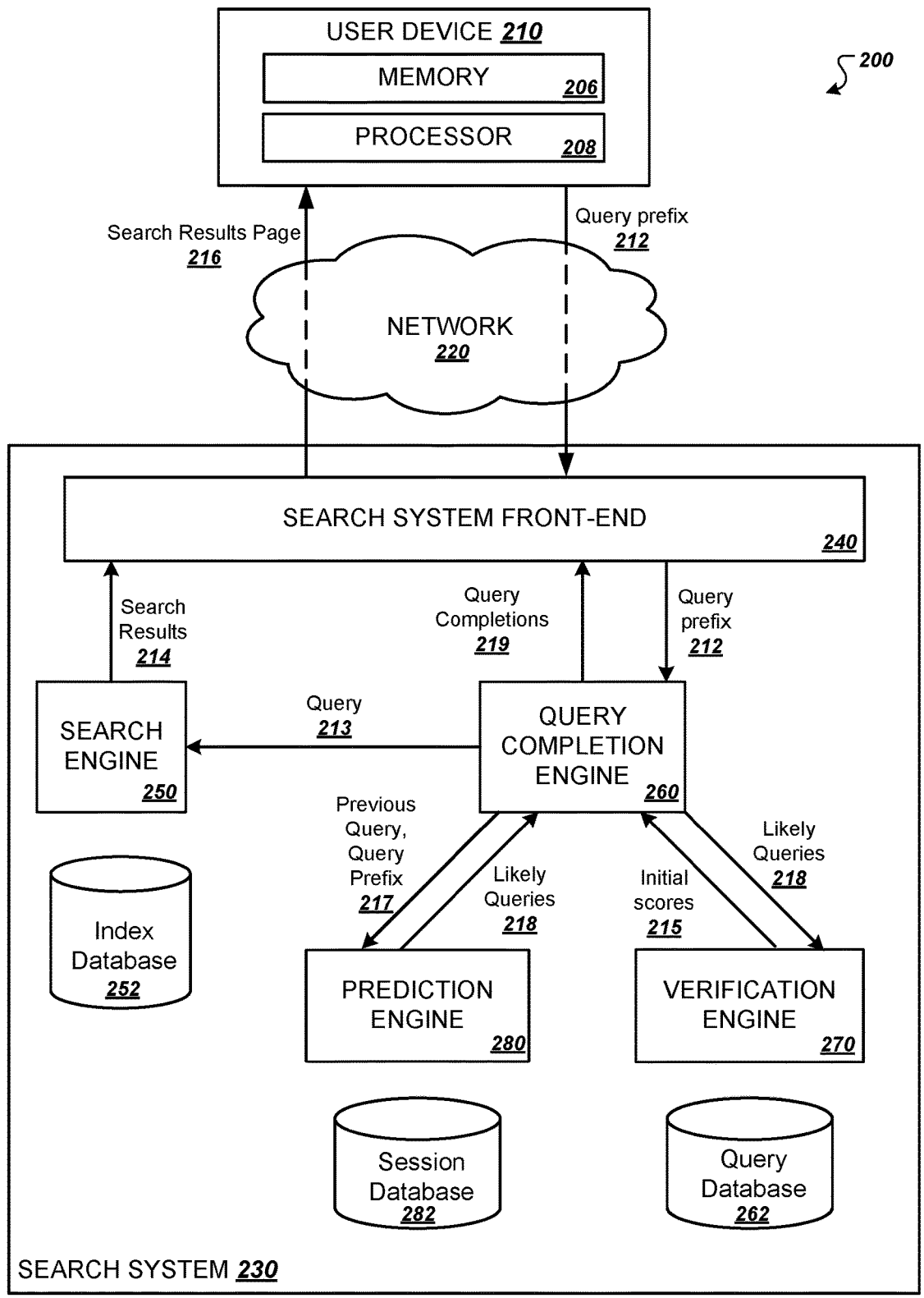
FIG. 2 is a diagram of an example system.

FIG. 2 is a diagram of an example system 200. In operation, the system communicates with a user device 210 coupled to a search system 230 over a network 220. The search system 230 is an example of an information retrieval system in which the systems, components, and techniques described below can be implemented.

In operation, the user device 210 transmits a message including a query prefix 212 to the search system 230, e.g., over the network 220. The query prefix 212 includes one or more characters and the message can include other information, for example, a location of the user device 210. The search system 230 generates a response, generally in the form of a search results page 216 that presents query completions 219 and optionally a search results page 216 that includes search results 214 identified as being responsive to a highest-ranked query completion for the query prefix 212. The search system 230 transmits the search results page 216 including the query completions 219 over the network 220 back to the user device 210 for presentation to a user.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors 208 for executing program instructions and memory 206, e.g., random access memory (RAM). The user device 210 can include computer readable media that store software applications, e.g., a browser or layout engine, an input device, e.g., a keyboard or mouse, a communication interface, and a display device.

The network 220 can be, for example, a wireless cellular network, a wireless local area network (WLAN) or Wi-Fi network, a Third Generation (3G), Fourth Generation (4G), or other telecommunications network, a wired Ethernet network, a private network such as an intranet, a public network such as the Internet, or any appropriate combination of such networks.

The search system 230 can be implemented as computer programs installed on one or more computers in one or more locations that are coupled to each through a network, which may, but need not be, network 220. The search system 230 includes a search system front-end 240, a search engine 250, a query completion engine 260, a verification engine 270, and a prediction engine 280.

In general, the search system front-end 240 receives the query prefix 212 from the user device 210 and routes the query prefix 212 to the query completion engine 260 to generate and rank query completions 219. The search system front-end 240 also provides the resulting search results page 216 that includes query completions 219 to the user device 210. In doing so, the search system front-end 240 acts as a proxy, or interface, between user devices and the search system 230.

If previous query information is available for the user that submitted the query prefix 212, the query completion engine 260 can communicate with a prediction engine 280 to provide the previous query and the query prefix 217. The prediction engine 280 can identify likely queries 218 by analyzing a very large collection of activity sessions in session database 282. The activity sessions together describe the activities of many users. The prediction engine 280 can determine correlations in large collections of data describing the activities of many users. The prediction engine 280 can maintain a session database 282 that stores user session data. The prediction engine 280 may be allowed to analyze activity sessions only when the system has data of a sufficient quantity. For example, to generate queries that are likely to co-occur with a given query in a collection of activity sessions, the prediction engine 280 may require there to be occurrences of the given query in many sessions, e.g., more than 500 sessions, having been received from many different users, e.g., more than 100 different users.

The query completion engine 260 can provide the likely queries 218 to a verification engine 270. The verification engine 270 can verify that the likely queries 218 are in a baseline collection of query completions in query database 262. For example, the verification engine 270 can analyze queries previously received by the search system to generate query database 262. The query database 262 may include data that reflects common query refinements entered by users. The verification engine 270 may also perform spelling correction, spam, or profanity filtering on the likely queries 218. The verification engine 270 then returns initial scores 215 to the query completion engine 260.

The query completion engine 260 then ranks the query completions 219 that will be provided to the user device 210 by combining scores computed by the prediction engine 280 and by the initial scores 215 received from the verification engine 270. For example, the query completion engine 260 can promote likely queries 218 that have high initial scores 215. Thus, the query completions 219 provided to the user device are more likely to include query completions that are likely to co-occur with the user's previous query in user activity sessions.

An activity session is data that describes activity of a particular user during a particular period of time, e.g., during one day, one week, or one month. In some implementations, the system considers a "user" to be any distinguishable source of activity, whether or not a particular individual. Additionally, certain user activity data may be treated in one or more ways before it is stored or used, so that personally identifiable information is removed. In some implementations, a user may be distinguished by, e.g., signed-in user identifier; an anonymous cookie, which identifies a particular Web browser but not necessarily a particular individual; an IP (Internet Protocol) address, which identifies a particular source of traffic on a network, but not necessarily a particular browser or individual; or by some other identifying information. In some implementations, users may be distinguished by the IP addresses of the user devices used in performing the activities. In some implementations, a user or group of users may be distinguished from other users by reference to the IP address of the user devices used in performing the activities. Multiple individuals may share IP addresses, or the activity of one individual may come from multiple IP addresses over time. In some implementations, other techniques such as signed-in user identifiers or anonymous cookies may additionally be used to distinguish between sources of activity. In some implementations, activities are recorded by the interactive system involved in the activity. In some implementations, activity information is also, or alternatively, collected by an application, e.g., a web browser toolbar, running on the user's device.

An activity can be any action performed by a user, or on behalf of a user, on any interactive system, e.g., a web search system, an image search system, a map system, an e-mail system, a social network system, a blogging system, a shopping system, just to name a few. An activity can also be an action directed to a user, e.g., a receipt of an e-mail message, or a higher level task. An activity can also be a status, e.g., that a user has an interest in film noir. The session activity data may also include additional types of information, e.g., a location where each query was issued.

A user action can be, for example, the submission of a particular query; the selection, in response to a particular query, of a particular search result, or of any search result; a visit, or a long visit, to a particular web site, page, or image; the viewing of a video; the submission of a request for directions to a point of interest; the receipt of a message confirming a hotel, flight, or restaurant reservation, or confirming purchase of a particular product or kind of product, or of a particular service or kind of service.

In some implementations, the sessions are defined as non-overlapping periods of a fixed length, e.g., one, two, three, five, seven, or ten days, or as overlapping periods of fixed length, in which case some activities could appear in more than one session. In some implementations, the activity sessions are aligned to start and end on the same schedule. For convenience, the session may be said to "contain" activity records or, for brevity, to "contain" activities; similarly, an activity or an activity record may be said to be "found in" a session. In some implementations, each session is represented by a separate document user activities are described by segments of text. Thus, according to context, the term "session" can also refer to the collected activity records assigned to a session, or a document representing the session. The query completion engine 260 can provide the previous query 217 to a prediction engine 280 in a request to obtain likely queries 218. The prediction engine 280 may also receive the previous query 217 from another module in the search system 230, e.g., from the search system front-end 240, from the search engine 250, or from the query database 262.

If the search results page 216 will also include search results, e.g., web search results that identify resources on the Internet, the query completion engine 260 can provide a highest-ranked query completion 213 to the search engine 250. In response to a received query 213, which may be a highest-ranked query completion, the search engine 250 generates search results 214 that identify resources in a collection of resources. The search engine 250 can rank the search results 214 using conventional methods and transmit the ranked search results 214 to search system front-end 240 for inclusion in the search results page 216.

Figure 3:
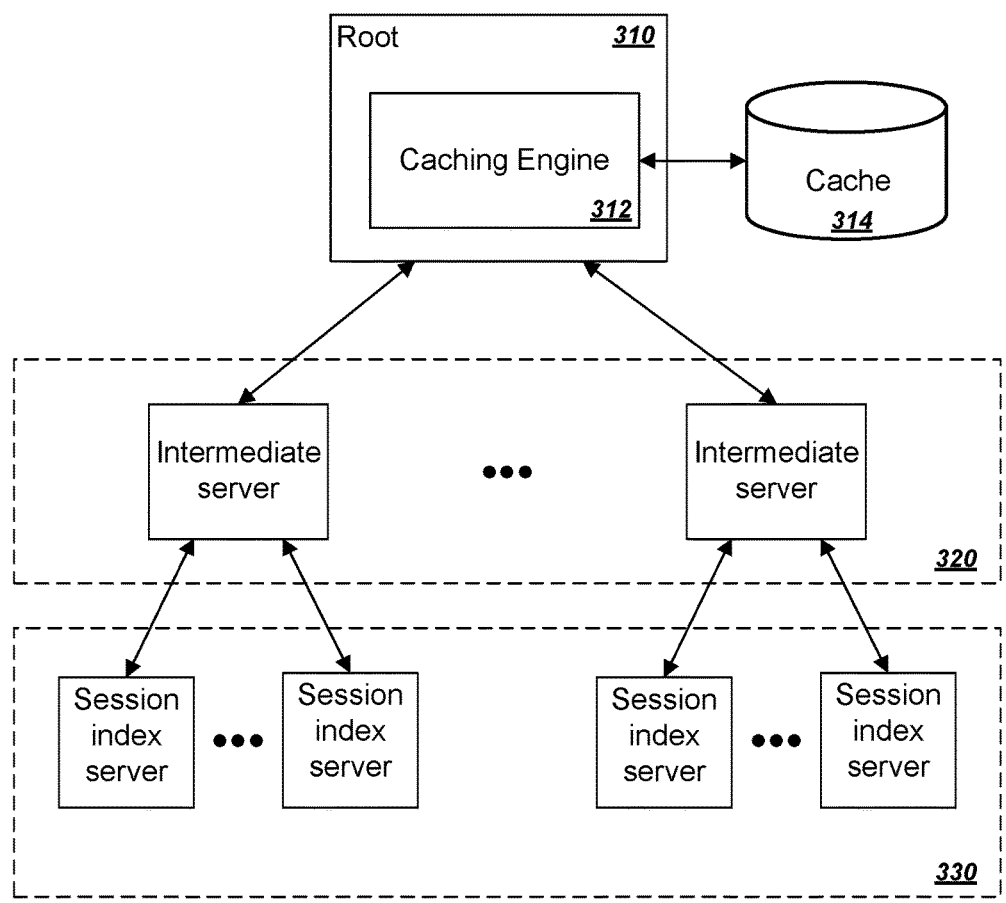
FIG. 3 illustrates the architecture of an example prediction engine employing leaf filtering and a cache.

FIG. 3 illustrates the architecture of an example prediction engine employing leaf filtering and a cache. The prediction engine is an example of a prediction engine that can generate likely queries for query completions.

The prediction engine includes a cluster 300 of index servers having a root server 310, a caching engine 312, a cache 314, one or more optional layers of intermediate servers 320, and session index servers 330 that are the leaf servers of the cluster. Each server in the cluster, including the root server, can have multiple replicas. The caching engine 312 may also be implemented on a machine separate from the root server 310.

When a request for queries likely to co-occur with a previous query is received by the root server 310, the root server 310 will provide a previous query and a query prefix to the caching engine 312. The caching engine maintains a cache 314 of previous query search requests. In some implementations, the cache is also keyed by the query prefix. Thus, a previous query and a query prefix combination uniquely identifies entries in the cache 314.

In some implementations, the system limits a number of characters in the query prefix, e.g., one letter, two letters, or three letters, for cache entries. In other words, if the system limits cache keys to one letter of the query prefix, a previous query "infant clothing" and a query prefix "ne" may refer to the same cache entry as a previous query "infant clothing" and a query prefix "n".

If the previous query is found in the cache 314, the caching engine 312 can immediately return one or more likely query completions that are associated with the previous query.

If the previous query is not found in the cache 314, the caching engine 312 will initiate a search for likely queries using the intermediate servers 320 and leaf servers 330. Searching using an example prediction engine is described in commonly owned U.S. patent application Ser. No. 13/928,939 for "Generalized Engine for Predicting Actions", to Jeffrey A. Dean, which is incorporated here by reference.

When the caching engine receives a result of the search, the caching engine 312 can add it to the cache 314. The caching engine can also write entries to the cache 314 to register that a search for a particular previous query is already in progress. Thus, if another request for a same previous query is received before the search is complete, the caching engine 312 can queue the subsequent request until the results of the in-progress search are received. When the results are received, the caching engine 312 can return the result for both requests.

To improve performance and to reduce network traffic resulting from communication among servers in the cluster 300, the prediction engine may employ leaf filtering by query prefix. In other words, the leaf servers will return only likely queries that begin with a particular query prefix. Leaf filtering is described in more detail below with reference to FIG. 4.

Figure 4:
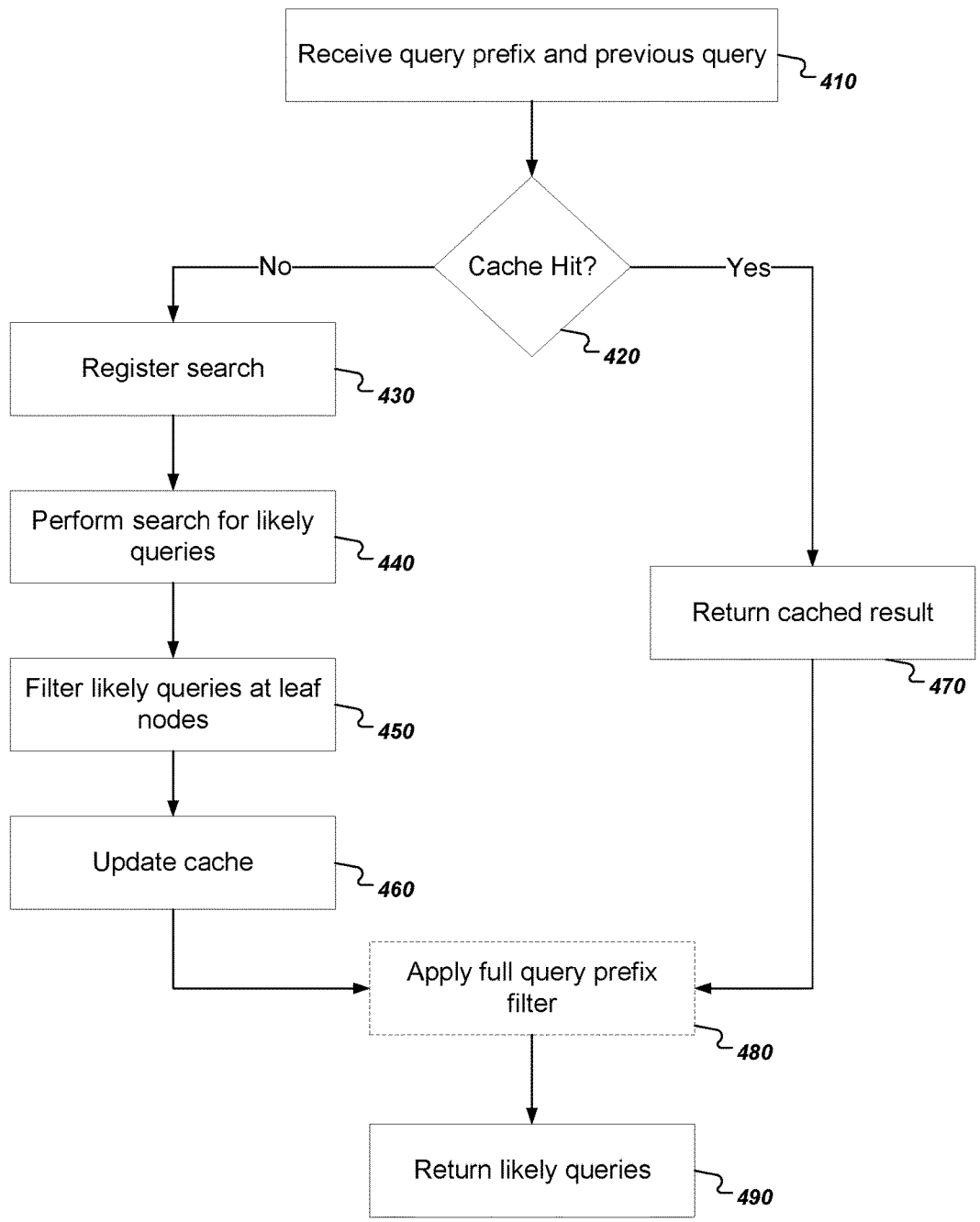
FIG. 4 is a flow chart of an example process for generating likely queries.

FIG. 4 is a flow chart of an example process for generating likely queries. In general, a prediction engine can employ leaf filtering and caching to reduce the latency of responding to query prefixes. The process will be described as being performed by a system of one or more appropriately programmed computers, e.g., the prediction engine 280 of FIG. 2.

The system receives a query prefix and a previous query (410). In general, the query prefix is a partial query received from a user as a user types a query into a user interface. In some implementations, the system uses a most recently submitted query by the user. In addition, the system can also consider other queries that were submitted within a threshold number of queries before the reference query. In other words, the system can also consider the second most recently submitted query, the third most recently submitted query, and so on.

The system determines whether there is a cache hit (420), if the system is implemented with a cache. In general, the cache includes one or more previously identified likely queries associated with a previous query and a query prefix, which, as described above, may be limited to a particular number of characters.

If the previous query and query prefix do not result in a cache hit, the system will optionally register the intention to perform a search for likely queries (branch to 430). For example, the system can generate an entry in the cache indicating that a search for a particular previous query and query prefix is already being conducted.

The system performs a search for likely queries (branch to 420). In general, a "likely" query is a query that co-occurs with the previous query in activity sessions with more likelihood than in activity sessions in general. The likely queries will each have a respective prediction score. The prediction score for a likely query represents a significance of a correlation between the likely query and the previous query.

The system can identify likely queries by identifying matching user activity sessions that include an occurrence of the previous query. The system can then compute the prediction score for the likely query, or signal, for each query in the matching sessions that indicates a likelihood that the query co-occurs with the reference query in a same session, compared to the likelihood of the query occurring over all user activity sessions.

In some implementations, the co-occurrences in the activity sessions need not be time-ordered. For example, the system can analyze all queries that are submitted at some time before or after a given query to identify likely queries. Similarly, the system can analyze all URLs visited by users sometime before or after submitting a particular query.

However, the system may impose time or activity proximity windows for two events to be considered co-occurring. For example, the system may consider two queries to co-occur in an activity session if they were both issued within a particular length of time of each other, e.g., within two hours, two days, or two weeks of each other, and within the same session. As another example, the system can consider two queries to co-occur in an activity session if they were both issued within a particular number of queries of each other, e.g., within 10 submitted queries of one another. In some implementations, the system generates correlations by using conventional collaborative filtering techniques.

The request to the prediction engine root server for likely queries may specify a reference parameter other than a previously submitted query. For example, the system can request likely queries from the root server by providing a particular reference parameter associated with a user's profile, e.g., an indicated interest, a particular geographic location, or having a preference for a particular language. The prediction engine can then identify likely queries that are likely to occur in activity sessions of users having the reference parameter.

Thus, while the example process is described as identifying a number of likely queries that are likely to co-occur with a previously submitted reference query, the system could alternatively use the activity sessions to determine queries that are likely to be submitted by users having any appropriate reference parameter, e.g., a particular interest.

While searching for likely queries, the system filters likely queries at the leaf nodes (450). In other words, the system can provide the query prefix to the leaf nodes, in addition to providing the previous query or queries, or other context information. The leaf nodes can use the query prefix to return only likely queries that begin with one or more letters of the query prefix, or have terms that begin with one or more letters of the query prefix, which can reduce the amount of data transferred between leaf nodes and intermediate servers, thereby reducing latency of the search. The system can alternatively or in addition filter likely queries at the level of the intermediate servers.

The system updates the cache (460), if the system uses a cache. The system can store a cache entry that includes the previous query and one or more characters of the query prefix as a key, and one or more identified likely queries as a value.

When using only a subset of characters of the query prefix for the key, the system may continually identify a same set of likely queries as a user continues to enter subsequent characters. In other words, the updated query prefix may still result in a cache hit even though it includes additional characters. By limiting the number of characters of the query prefix used as a key, the system can increase the cache hit rate and reduce latency.

If there was initially a cache hit (420), the system returns the cached result (470). In other words, the system can use the previous query and one or more characters of the query prefix as a key into the cache to obtain one or more previously identified likely queries.

The system optionally applies a full query prefix filter (470). After obtaining one or more likely queries for the previous query and query prefix, the system may still further filter the likely queries to match the full query prefix. For example, if the previous query was "yoga mats" and the query prefix was "lu", the system may return a likely query that includes "lululemon". However, if the user's query prefix was actually "lun", the system may filter out "lululemon" and not return that query to the user.

The system returns the likely queries (490). Each likely query will have an associated prediction score that represents a significance of a correlation between the likely query and the previous query or another parameter, e.g., a user location that was provided in the request for likely queries.

Figure 5:
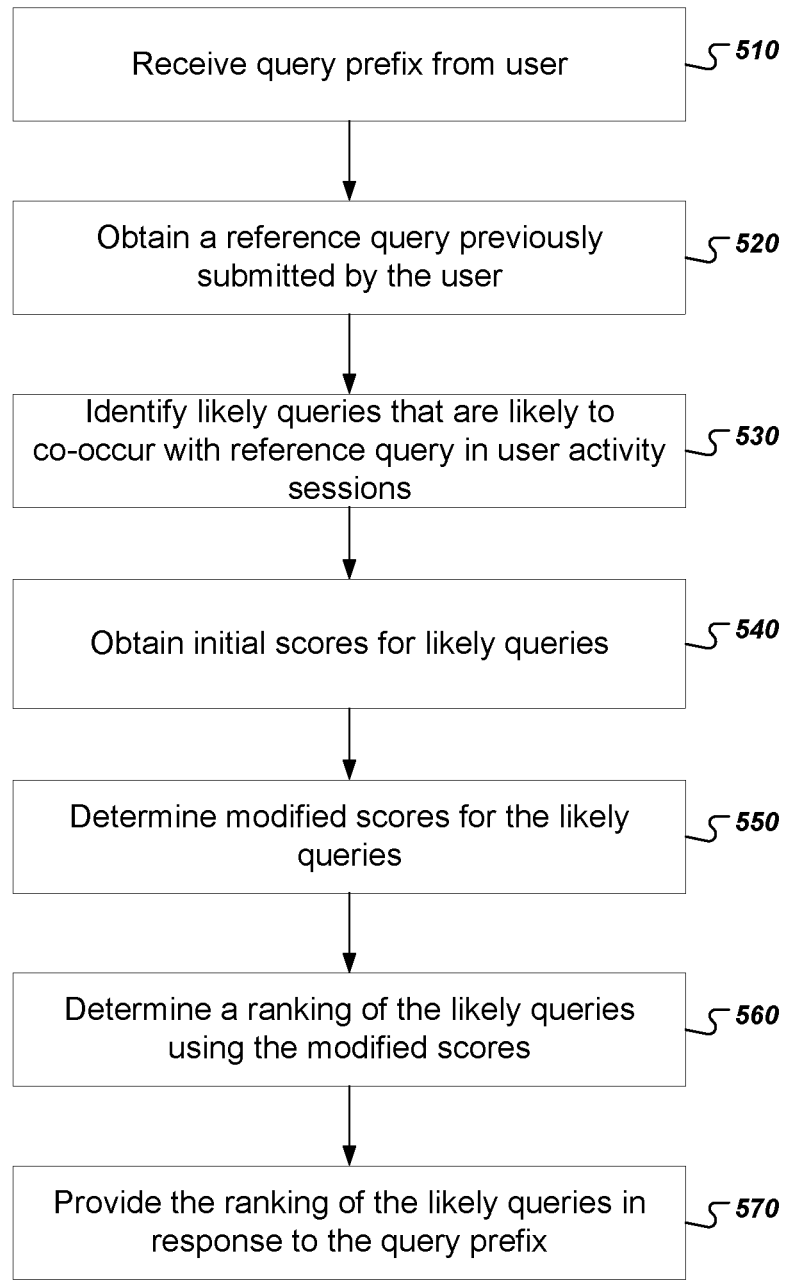
FIG. 5 is a flow chart of an example process for generating query completions using likely queries.

FIG. 5 is a flow chart of an example process for generating query completions using likely queries. In general, the system receives a query prefix and one or more likely queries that are likely to co-occur with a reference query in user activity sessions. The system can then rank the query completions using initial scores and scores computed by a prediction engine. The process can be implemented by one or more computer programs installed on one or more computers. The process will be described as being performed by a system of one or more appropriately programmed computers, e.g., the query completion engine 260 of FIG. 2.

The system receives a query prefix from a user (510). For example, the system can receive a query prefix as entered by the user in a web browser application on a user device.

The system obtains a reference query previously submitted by the user (520).

The system identifies likely queries that are likely to co-occur with the reference query in user activity sessions (530). For example, the system can identify likely queries as described above with reference to FIG. 4.

The system obtains initial scores of the one or more likely queries (540). The system can obtain the initial scores for the likely queries from a baseline collection of query completions for a particular query prefix.

If no initial score is found or if a particular likely query does not otherwise occur in the baseline collection of query completions, the system can filter out the particular likely query. In this way, the system can leverage filters for profanity or spam that have already been implemented in the baseline collection.

The system determines modified scores for the likely queries (550). In some implementations, the system computes a ranking factor for a likely query x based on the probability P(x|q) of the likely query x occurring in an activity session given that the reference query q also occurred in the same activity session, compared to the probability P(x) of the likely query x appearing in any activity session. For example, the system can compute a ranking factor R that is given by:

$$R = \frac{P(x \mid q)}{P(x)}. \tag{1}$$

The system can then compute a new score S' for a matching query completion having an initial score S according to:

$$S' = R \times S.$$

The system can estimate P(x|q) and P(x) using a number of occurrences of each event in the activity sessions. For example, the system can compute P(x|q) according to a number of times $N_{x,q}$ a session included the likely query x and the reference query q, divided by a number of times $N_q$ a session included the reference query q, given by:

$$P(x \mid q) = \frac{N_{x,q}}{N_q}. \quad (2)$$

Similarly, the system can compute P(x) according to a number of times $N_x$ a session included the likely query x, divided by a total number of sessions N, given by:

$$P(x) = \frac{N_x}{N}.$$

The system determines a ranking of the likely queries using the modified scores (560). In some implementations, if the modified score for a particular likely query is below a threshold, the system may filter out the likely query.

The system provides the ranking of the likely queries in response to query prefix (570).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a query prefix input by a user;
   obtaining a reference parameter for the user;
   computing, for each query of one or more queries, a respective first score representing a likelihood that the reference parameter and the query co-occur in user activity sessions of a collection of a user activity sessions;
   computing, for each query of the one or more queries, a respective second score representing a likelihood that the query occurs in the user activity sessions;
   computing, for each query of the one or more queries, a respective ranking factor that represents a ratio between the first score for the query and the second score for the query; and
   computing, for each query of the one or more queries, a respective new ranking score for the query including multiplying a respective initial ranking score for the query by the ranking factor for the query;
   ranking the one or more queries according to the new ranking scores for the one or more queries; and
   providing one or more highest-ranked queries as a query completion for the query prefix.

2. The method of claim 1, wherein the reference parameter is a query previously submitted by the user.

3. The method of claim 1, wherein the reference parameter is a geographic location, a language preference, or an interest associated with a user profile for the user.

4. The method of claim 1, further comprising obtaining initial ranking scores of the one or more queries from in a baseline collection of query completions for the query prefix.

5. The method of claim 1, further comprising identifying the one or more queries including:
   determining that the reference parameter and one or more characters of the query prefix correspond to an entry in a cache, wherein each cache entry in the cache is associated with one or more previously determined queries completions; and
   identifying, as the one or more queries, one or more queries associated with the entry in the cache.

6. The method of claim 1, further comprising:
   receiving a second query prefix comprising a character submitted by the user subsequent to the query prefix;
   generating a key comprising the reference parameter and a subset of characters of the query prefix;
   determining that the key corresponds to an entry in a cache; and
   returning the one or more queries associated with the entry in the cache.

7. The method of claim 6, further comprising:
   filtering out the one or more queries according to the second query prefix that includes the character submitted by the user subsequent to the query prefix.

8. The method of claim 1, further comprising identifying the one or more queries including:
   determining that a process has registered a search of user activity sessions using the reference parameter and the query prefix; and
   after the process has completed the search of user activity sessions, obtaining the one or more queries from a result of the search.

9. The method of claim 1, wherein the query prefix includes multiple characters, and further comprising identifying the one or more queries including:
provided, to one or more leaf servers, a first character of the query prefix, wherein each leaf server returns, to an intermediate server or a root server, only queries that begin with the first character of the query prefix.

10. The method of claim 1, further comprising:
determining whether the one or more queries occur in a baseline collection of query completions; and
filtering out any of the one or more queries that do not occur in the baseline collection of query completions.

11. A system comprising:
one or more computers and one or more storage devices storing instructions that are operable, when executed by the one or more computers, to cause the one or more computers to perform operations comprising:
receiving a query prefix input by a user;
obtaining a reference parameter for the user;
computing, for each query of one or more queries, a respective first score representing a likelihood that the reference parameter and the query co-occur in user activity sessions of a collection of a user activity sessions;
computing, for each query of the one or more queries, a respective second score representing a likelihood that the query occurs in the user activity sessions;
computing, for each query of the one or more queries, a respective ranking factor that represents a ratio between the first score for the query and the second score for the query; and
computing, for each query of the one or more queries, a respective new ranking score for the query including multiplying a respective initial ranking score for the query by the ranking factor for the query;
ranking the one or more queries according to the new ranking scores for the one or more queries; and
providing one or more highest-ranked queries as a query completion for the query prefix.

12. The system of claim 11, wherein the reference parameter is a query previously submitted by the user.

13. The system of claim 11, wherein the reference parameter is a geographic location, a language preference, or an interest associated with a user profile for the user.

14. The system of claim 11, wherein the operations further comprise obtaining initial ranking scores of the one or more queries from in a baseline collection of query completions for the query prefix.

15. The system of claim 11, wherein the operations further comprise identifying the one or more queries including:
determining that the reference parameter and one or more characters of the query prefix correspond to an entry in a cache, wherein each cache entry in the cache is associated with one or more previously determined queries completions; and
identifying, as the one or more queries, one or more queries associated with the entry in the cache.

16. The system of claim 11, wherein the operations further comprise:
receiving a second query prefix comprising a character submitted by the user subsequent to the query prefix;
generating a key comprising the reference parameter and a subset of characters of the query prefix;
determining that the key corresponds to an entry in a cache; and
returning the one or more queries associated with the entry in the cache.

17. The system of claim 16, wherein the operations further comprise:
filtering out the one or more queries according to the second query prefix that includes the character submitted by the user subsequent to the query prefix.

18. The system of claim 11, wherein the operations further comprise identifying the one or more queries including:
determining that a process has registered a search of user activity sessions using the reference parameter and the query prefix; and
after the process has completed the search of user activity sessions, obtaining the one or more queries from a result of the search.

19. The system of claim 11, wherein the query prefix includes multiple characters, and further comprising identifying the one or more queries including:
providing, to one or more leaf servers, a first character of the query prefix, wherein each leaf server returns, to an intermediate server or a root server, only queries that begin with the first character of the query prefix.

20. The system of claim 11, wherein the operations further comprise:
determining whether the one or more queries occur in a baseline collection of query completions; and
filtering out any of the one or more queries that do not occur in the baseline collection of query completions.

21. A computer program product, encoded on one or more non-transitory computer storage media, comprising instructions that when executed by one or more computers cause the one or more computers to perform operations comprising:
receiving a query prefix input by a user;
obtaining a reference parameter for the user;
computing, for each query of one or more queries, a respective first score representing a likelihood that the reference parameter and the query co-occur in user activity sessions of a collection of a user activity sessions;
computing, for each query of the one or more queries, a respective second score representing a likelihood that the query occurs in the user activity sessions;
computing, for each query of the one or more queries, a respective ranking factor that represents a ratio between the first score for the query and the second score for the query; and
computing, for each query of the one or more queries, a respective new ranking score for the query including multiplying a respective initial ranking score for the query by the ranking factor for the query;
ranking the one or more queries according to the new ranking scores for the one or more queries; and
providing one or more highest-ranked queries as a query completion for the query prefix.

* * * * *